UNITED STATES PATENT OFFICE.

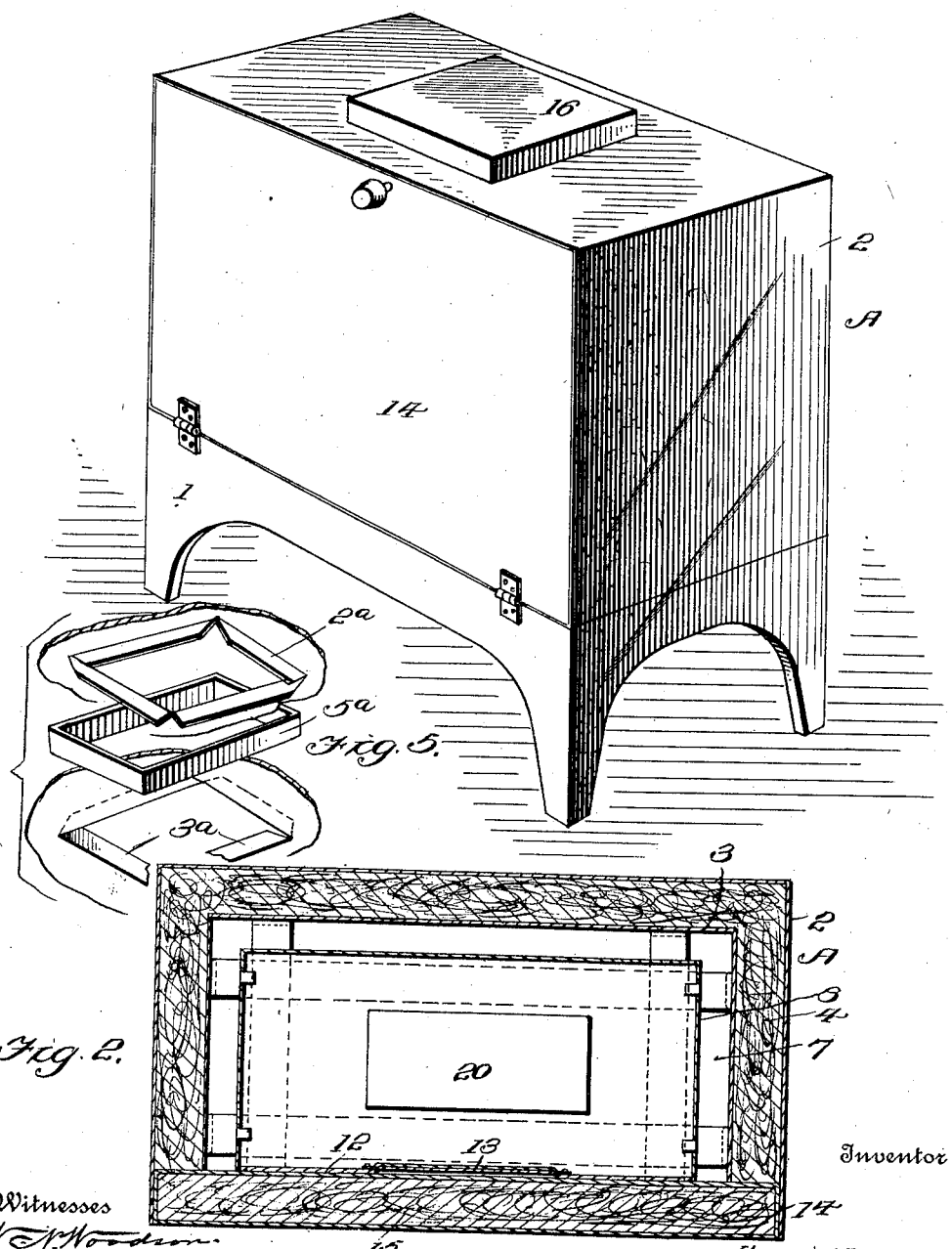

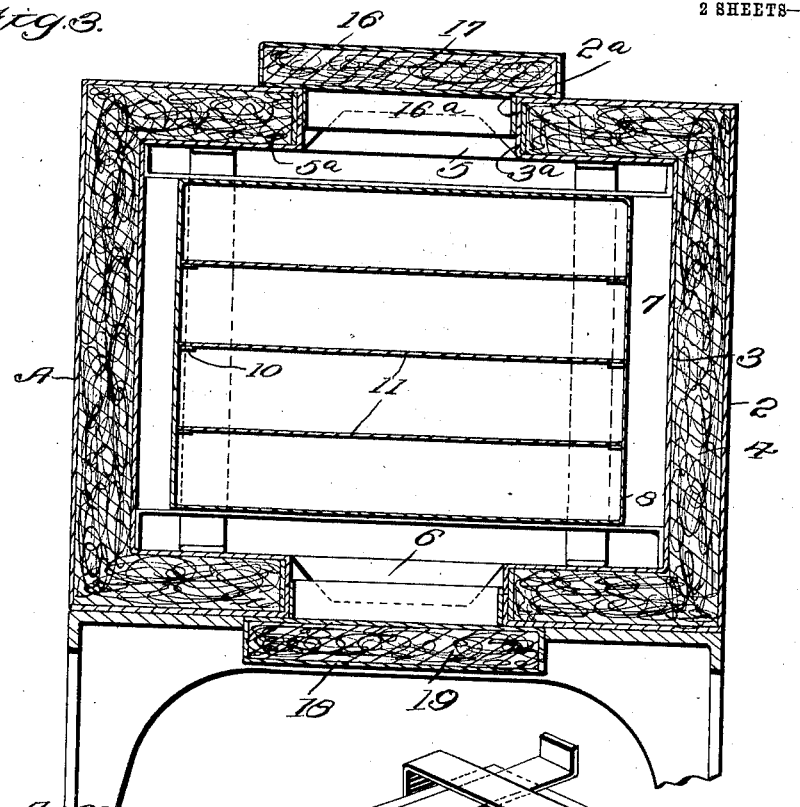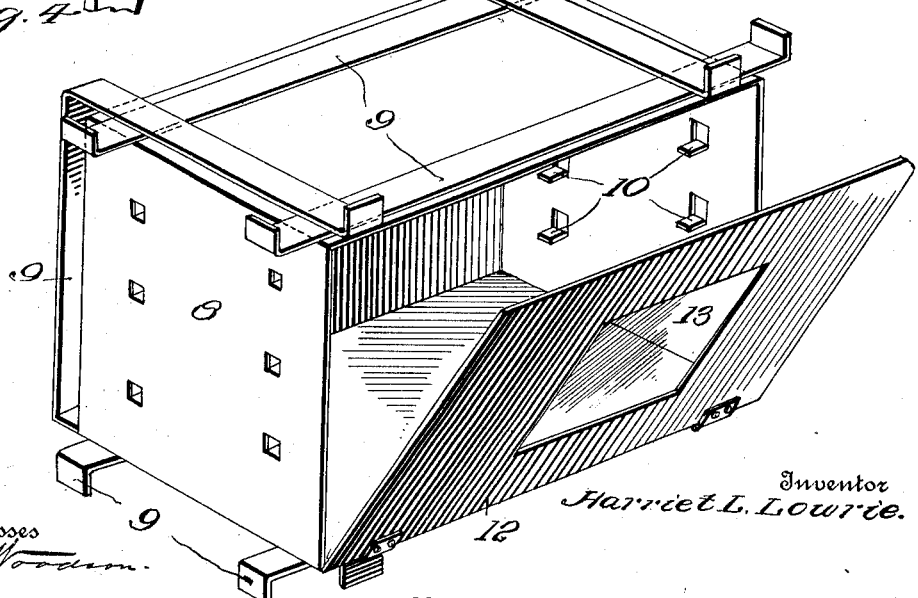

HARRIET L. LOWRIE, OF BRADFORD, PENNSYLVANIA.

HEAT-INSULATED OVEN.

1,002,716.  Specification of Letters Patent.  Patented Sept. 5, 1911.

Application filed December 6, 1910. Serial No. 595,970.

*To all whom it may concern:*

Be it known that I, HARRIET L. LOWRIE, citizen of the United States, residing at Bradford, in the county of McKean and State of Pennsylvania, have invented certain new and useful Improvements in Heat-Insulated Ovens, of which the following is a specification.

This invention comprehends certain new and useful improvements in domestic ovens, and the invention has for its primary object a simple and efficient construction of device which may be used either as a fireless cooker, or as an oven or baker to be heated by the flame of a gas, gasolene, or other burner, the invention consisting in certain constructions and arrangements of the parts I shall hereinafter fully describe and claim.

For a full understanding of the invention, reference is to be had to the following description and accompanying drawings, in which:

Figure 1 is a perspective view of an oven constructed in accordance with my invention; Fig. 2 is a horizontal sectional view thereof; Fig. 3 is a vertical longitudinal section; Fig. 4 is a perspective view of the oven or food receptacle; and, Fig. 5 is a perspective view illustrating in detail the means for forming the top and bottom openings leading into the space which surrounds the food receptacle.

Corresponding and like parts are referred to in the following description and indicated in all the views of the drawings by the same reference characters.

Referring to the drawings, A designates the casing of my improved oven, the same being formed of any desired material such as japanned tin of any desired size and shape, preferably rectangular, said casing being supported upon a base or legs 1. The casing A embodies an outer wall 2 and an inner wall 3 spaced from the outer wall, packing 4 of mineral wool or asbestos or the like, filling the space between the inner and outer walls. The casing A is formed with a top opening 5 and a bottom opening 6, leading into the space 7 which is provided between the inner wall 3 and the food receptacle 8, the latter being secured in spaced relation to the inner wall 3 by strap brackets 9. In the present embodiment of the invention, the top opening 5 is formed by a preferably sheet metal spacing strip 5ᵃ of rectangular form, the outer wall 2 and the inner wall 3 being defined at said opening by downwardly and upwardly projecting flanges 2ᵃ and 3ᵃ which engage the spacing band and are connected thereto in any desired way, whereby the walls of the opening are effectually reinforced and the outer and inner walls 2 and 3 also reinforced and held in properly spaced relation to each other. The bottom opening 6 is correspondingly formed. The food receptacle 8 in the present instance is formed on opposite sides with lugs 10 on which shelves or racks 11 are adapted to rest, so as to support food within the receptacle. These shelves 11 may be made either of sheet metal or of wire. The food receptacle is also provided with a front door 12 which may open outwardly and downwardly, as shown, being held closed in any desired way, said door being provided with a mica or glass panel 13 whereby the contents of the receptacle may be viewed from time to time as required, without opening the door 12 and permitting the heat to escape. The casing A is provided with an outer double wall door 14 adapted to close against the front of the casing, the said door containing packing 15 of asbestos or similar non-conducting substances.

16 designates a closure for the top opening 5, said closure being detachably or hingedly connected to the top of the casing A and adapted to tightly close the opening, the closure being of double-wall formation with packing 17 of asbestos or the like, and being provided with a depending flange 16ᵃ adapted to fit within the opening 5. 18 designates a corresponding closure for the bottom opening 6, said bottom closure being provided with packing 19.

When my improved oven is used as a fireless cooker, the top and bottom closures 16 and 18 are placed in position, and any desired number of radiators 20, heated to a temperature, say where they will scorch white paper, are placed within the food receptacle 8, either resting on the bottom thereof, or for instance, when bread is to be baked, one or more resting on the bottom, and another or others on a top shelf, the bread being placed in between. The food is then left the required time, and it is to be noted that no heat will be lost, as the food may be viewed from time to time through the transparent panel 13 of the inner door 12, without the necessity of opening said door.

When the device is to be used in connection with the flame of a gasolene, gas, or other burner, the closures 16 and 18 are open or removed, the burner is placed at the bottom opening within the base of the device, or the casing is placed over the burner of a stove, for instance, and the cooking operation is thus accomplished, the removal of both bottom and top closures, permitting a circulation of the heat and producing a draft all around the food receptacle. Manifestly, when the device is used in connection with a burner and the food is thereby cooked to the degree necessary, the device may be removed from the burner or the flame of the burner extinguished and the closures 16 and 18 may be again applied to their positions and the food may continue to be cooked, in the manner of a fireless cooker, or maintained for a considerable time in warm condition, owing to the non-conductivity of the walls of the casing A.

Having thus described the invention, what is claimed as new is:

1. An oven of the character described, comprising a casing embodying outer and inner walls and packing therebetween, the casing being provided with top and bottom openings, spacing bands defining said openings, the inner and outer walls being formed at said openings with flanges extending toward each other and connected to the spacing bands, whereby to reinforce the walls of the openings and the inner and outer walls of the casing and to hold the latter in properly spaced relation to each other, a food receptacle held within the casing in spaced relation to the inner wall thereof, the openings leading to the food receptacle, and closures for said top and bottom openings.

2. An oven of the character described, comprising a casing embodying outer and inner walls and packing therebetween, the casing being provided with top and bottom openings, spacing bands defining said openings, the inner and outer walls being formed at said openings with flanges extending toward each other and connected to the spacing bands, whereby to reinforce the walls of the openings and the inner and outer walls of the casing and to hold the latter in properly spaced relation to each other, a food receptacle held within the casing in spaced relation to the inner wall thereof, the openings leading to the food receptacle, and closures for said top and bottom openings, said closures being each formed with double walls and packing therebetween and with flanges adapted to extend into the openings.

In testimony whereof, I affix my signature in presence of two witnesses.

HARRIET L. LOWRIE. [L. S.]

Witnesses:
 KATHARINE BURKE,
 EDGAR W. TAIT.

---

Copies of this patent may be obtained for five cents each, by addressing the "Commissioner of Patents, Washington, D. C."